US007111543B2

(12) United States Patent
Sayatovich

(10) Patent No.: US 7,111,543 B2
(45) Date of Patent: Sep. 26, 2006

(54) METHOD OF MAKING A LARIAT

(76) Inventor: Joe Sayatovich, Box 550, Campo, CA (US) 92006

( * ) Notice: Subject to any disclaimer, the term of this patent is extended or adjusted under 35 U.S.C. 154(b) by 87 days.

(21) Appl. No.: 10/994,458

(22) Filed: Nov. 23, 2004

(65) Prior Publication Data

US 2006/0107907 A1    May 25, 2006

(51) Int. Cl.
*D02G 3/02* (2006.01)
(52) U.S. Cl. .............................. 87/1; 57/258
(58) Field of Classification Search .............. 87/1; 57/7, 232, 241, 250, 258; 119/805; 289/1.5
See application file for complete search history.

(56) References Cited

U.S. PATENT DOCUMENTS

| 3,379,552 A | 4/1968 | Kurtz |
| 3,478,140 A | 11/1969 | Kronenthal et al. |
| 3,527,650 A | 9/1970 | Block |
| 3,960,050 A | 6/1976 | Eisler |
| 4,401,327 A | 8/1983 | Caines |
| 4,532,929 A | 8/1985 | Mattei et al. |
| 5,113,570 A * | 5/1992 | Steinkotter .................. 29/433 |
| 5,182,786 A | 1/1993 | Kinaga et al. |
| 6,470,664 B1 | 10/2002 | Sullivan |

OTHER PUBLICATIONS

"The King in Rope Manufacturing," Spin to Win Magazine, Jun. 2001, vol. 5, No. 4, pp. 38-45.
"Rope Making 101," Spin to Win Magazine, Apr. 2003, vol. 7, No. 3, pp. 26-30.

* cited by examiner

*Primary Examiner*—Shaun R. Hurley
(74) *Attorney, Agent, or Firm*—Mattingly, Stanger, Malur & Brundidge, P.C.

(57) ABSTRACT

A method of making a lariat includes twisting under tension a plurality of strands of a plastic material such as nylon to form a rope and then securing the ends of the rope to prevent the strands from untwisting. The rope is then dipped into a hot wax mixture, removed from the hot wax and dried and cooled. A powdery material such as talcum powder is then applied to a portion of the rope adjacent one end after loosely tying a hondo knot therein or prior to tying a hondo knot the powdery material is applied and a hondo knot is then tied and the hondo knot is snugged by stretching the rope.

10 Claims, 1 Drawing Sheet

METHOD OF MAKING A LARIAT

BACKGROUND OF THE INVENTION

1. Field of the Invention

The present invention relates to a lariat and, more particularly, to a method of making a lariat which includes an improvement in the step of forming a hondo in the lariat rope.

2. Description of the Related Art

In competitive roping contest such as in calf and steer roping and in the ranching industry lariats are in frequent and common use. Lariats are also often referred to as lassos. Lariats or lassos have been used in competitive roping contests and in ranching for many years. A lariat is formed by tying a hondo at one end of a rope to form a knotted or spliced eye through which the other end of the rope is passed to form a running noose. The hondo or eye may be protected by a leather or similar shield attached thereto called a burner to take the wear and extend the life of the lariat.

Lariats initially were made by using manila ropes, but in more recent years, more expensive but superior ropes have been constructed of plastic materials such as nylon and/or polyester.

One method of forming a rope is described in U.S. Pat. No. 6,470,664 by twisting together strands of a plastic material such as nylon under tension to form a rope, tying knots in the ends of the rope to prevent the strands from untwisting, dipping the rope into a hot wax mixture, removing the rope from the hot wax and letting the rope cool, forming a hondo at one end of the rope and subsequently coating or dusting the rope with a fine talc after tying a hondo knot to make the rope slide easier.

In connection with ropes constructed of plastic materials such as nylon, the nylon makes it more difficult to tie a secure hondo knot in the rope that does not slip since plastic materials tend to make a knot slip. In order to make the hondo knot tightly secure, it is necessary to stretch the rope to a considerable degree after the knot has been tied therein. For example, in a lariat having a length of thirty feet, it is necessary to stretch the rope seven and halt to eight feet beyond Its normal length In order to securely tighten the hondo knot. This requires a relatively large amount of time, effort and expense.

SUMMARY OF THE INVENTION

It is an object of the present invention to provide a method of making a lariat which avoids the disadvantages of the prior art discussed above by providing an improved method of making a lariat in which a portion of the lariat rope adjacent one end thereof is loosely tied into a hondo knot and then coated or dusted with a powdery material or is dusted or coated with a powdery material prior to tying a hondo knot to form the hondo and subsequently stretching the rope after the hondo knot has been formed.

A further object of the invention is to provide an improved method of manufacturing a lariat which reduces the amount and time of stretching the rope after the hondo knot has been formed.

It is a still further object of the invention to provide an improved method of manufacturing a lariat which is faster and more economical than previously known.

The present invention achieves the above and other objects by providing a method of making a lariat comprising the steps of twisting together under tension a plurality of strands of a plastic material such as nylon to form a rope, securing the ends of the rope to prevent the strands from untwisting, dipping the rope into hot wax, removing the rope from the hot wax and letting the rope cool and dry, loosely tying a hondo knot in one end of the rope and then coating or dusting the hondo knot with a powdery material such as a fine talcum powder, or coating or dusting one end of the rope with a powdery material such as fine talcum powder and then tying a hondo knot at the powder coated end of the rope to form a hondo, and subsequently snugging the hondo knot by stretching the rope. In addition to nylon material, other suitable plastic materials may be used such as polyester and dacron or a blend of nylon, polyester and/or dacron.

DETAIL DESCRIPTION OF THE PREFERRED EMBODIMENTS

Figure 1:
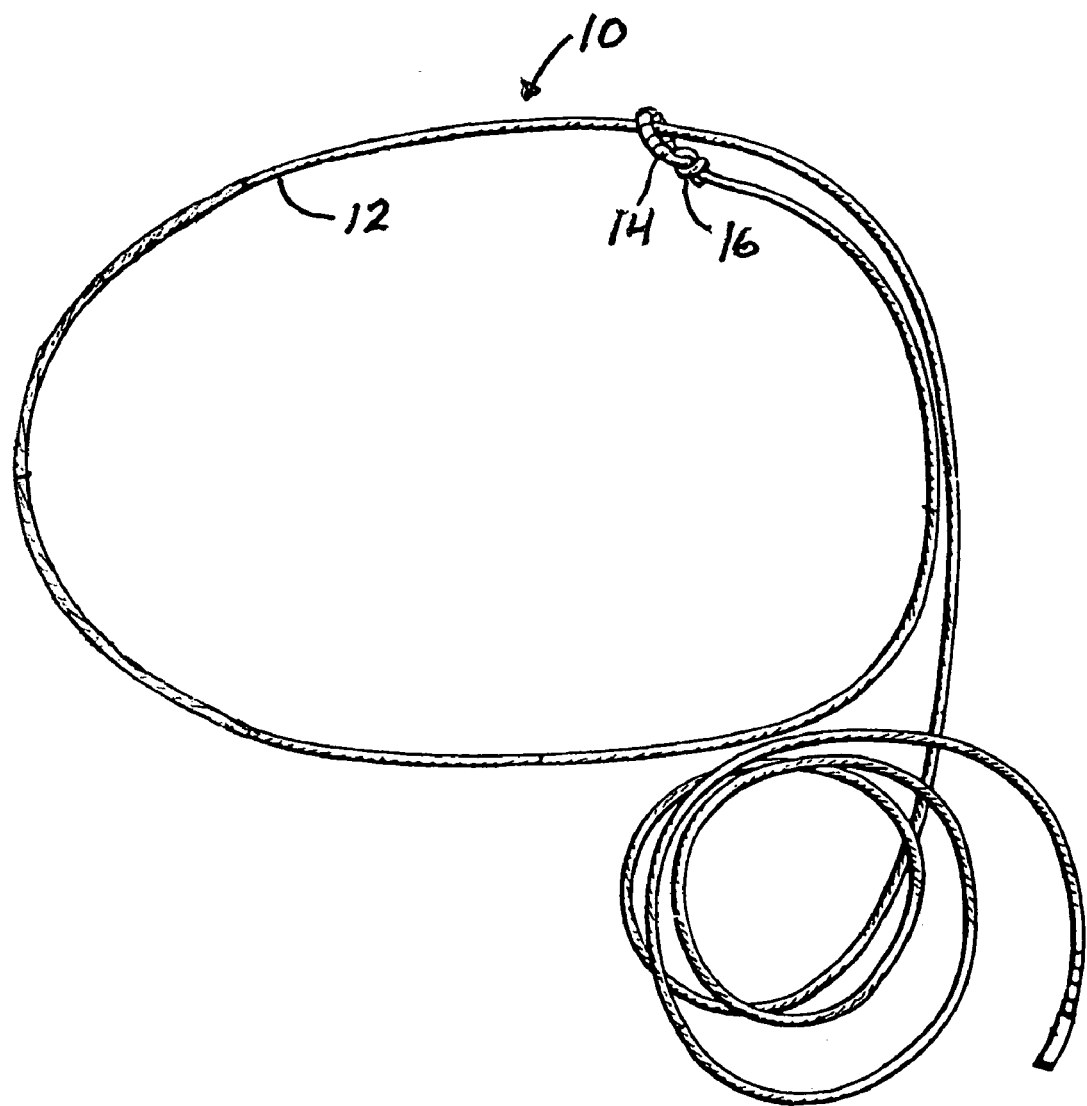
FIG. 1 is a plan view of a lariat constructed in accordance with the present invention.

Shown in FIG. 1 is a lariat, generally designated by the numeral 10, comprised of a rope body 12 having a hondo 14 formed at one end by tying a hondo knot 16. The hondo forms an eye or small loop through which the other end of the rope passes. The present invention relates to an improved method of tying and securing the hondo knot 16.

Modern day lariats are generally constructed of a plastic material such as nylon formed by twisting together a plurality of nylon threads or yarns into strands. A plurality of strands is then twisted together under tension in a rope making machine to form the body of the rope. After the body of the rope is formed in a specified length, the rope is then immersed or dipped in a hot wax mixture for a suitable time such as approximately ten minutes and then removed from the wax mixture and allowed to cool off and dry. During this cooling and drying, any excess wax is removed by any suitable means such as being put on a stretcher to pop off the excess wax while the wax ropes are still hot. The ends of the rope are then secured by tying a suitable knot such as an overhand knot in each end of the rope body.

A hondo, which is a small eye or loop, is then formed on one end of the rope by tying a hondo knot. The hondo knot is then snugged by pulling on the rope with a substantial degree of tension to stretch the rope until the hondo knot is securely tightened and will not come loose. In the conventional known method of making a lariat, the rope is dusted or coated with a powdery material such as talcum powder after the hondo knot has been tied and the rope has been stretched to secure the hondo knot. The powdery material is applied to the rope so that it will easily slide through the hondo.

In the improved method of the present invention, however, the rope Is dusted with a powdery material such as a fine talcum powder prior to stretching to tighten the hondo knot. The powdery material may be applied at two different times in Applicant's improved method. One preferred method is to loosely tie the hondo knot In one end of the rope and then coat or dust the end of the rope and the knot with powder and subsequently tighten or snug the hondo knot by pulling on the rope with a substantial degree of tension to stretch the end of rope until the hondo knot is securely tightened.

Another method of the present invention is to first coat or dust one end of the rope with a powdery material such as a fine talcum powder and then tie a hondo knot at the powdered end of the rope and subsequently tighten or snug the hondo knot by pulling on the rope with a substantial degree of tension to stretch the end of the rope until the hondo knot is securely tightened.

One suitable way of coating the hondo knot end of the rope with a powdery material is to place the hondo end of the rope in a container filled with a powdery material and submerge the end of the rope in the powdery material and agitate the rope in the powdery material until a suitable coating of the powdery material has been applied to the rope.

The powdery material lowers the coefficient of friction on the surface of the rope formed of plastic material and therefore the rope slips more easily over itself to tighten the hondo knot to a point where sufficient knot security is obtained. The lowering of the friction causes the rope to slip more easily with respect to itself whereby the amount of stretching normally required to tightly secure the hondo knot is reduced by 30 to 35 percent. This thus reduces the amount of time, effort and expense necessary to manufacture the rope. Moreover, since the rope does not have to be stretched for as long and as far, the rope is softer and therefore has better handling characteristics.

A suitable plastic material such as nylon is desirable because it has a high tensile strength and a high melting point as well as having high tenacity and being extensible. Other suitable plastic materials include polyester and dacron. The rope also may be comprised of a blend or mixture of strands of different types of these plastic materials.

Numerous other modifications and adaptations of the present invention would be apparent to those skilled in the art and thus, it is intended by the following claims to cover all such a modifications and adaptations which fall within the true spirit and scope of the invention.

What is claimed is:

1. In a method of making a lariat comprising the steps of twisting together under tension a plurality of strands of plastic material to form a rope, securing the ends of the rope to prevent the strands from untwisting, dipping the rope into hot wax, removing the rope from the hot wax and letting the rope cool, and forming a hondo at one end of the rape, the improvement comprising loosely tying a hondo knot at one end the rope, applying a powdery material to said one end of the rope having the hondo knot therein in an amount sufficient to coat the hondo knot to lower the coefficient of friction on the surface thereof and snugging the hondo knot by stretching the rope until knot security is obtained. with the powdery material reducing the amount of stretching required to obtain knot security.

2. The method of claim 1, wherein said powdery material is talcum powder.

3. The method of claim 1, wherein said strands are comprised of a blend of different plastic materials.

4. The method of claim 1, wherein said strands are comprised of nylon material.

5. The method of claim 1, wherein said strands are comprised of polyester material.

6. In a method of making a lariat comprising the steps of twisting together under tension a plurality of strands of plastic material to form a rope, securing the ends of the rope to prevent the strands from untwisting. dipping the rope into hot wax, removing the rope from the hot wax and letting the rope cool, and forming a hondo at one end of the rope, the improvement comprising applying a powdery material to a portion of the rope adjacent said one end, in an amount sufficient to coat said one end whereby the coefficient of friction on the surface thereof is lowered, prior to forming a hondo knot, loosely tying a hondo knot In said one end of the rope and snugging the hondo knot by stretching the rope until knot security is obtained. with the powdery material reducing the amount of stretching required to obtain knot security.

7. The method of claim 6, wherein said powdery material is talcum powder.

8. The method of claim 6, wherein said strands are comprised of a blend of different plastic materials.

9. The method of claim 6, wherein said strands are comprised of nylon material.

10. The method of claim 6, wherein said strands are comprised of polyester material.

* * * * *